United States Patent
Liu et al.

(10) Patent No.: US 9,954,659 B2
(45) Date of Patent: Apr. 24, 2018

(54) FRAME TRANSMISSION METHOD AND APPARATUS FOR WIRELESS LOCAL AREA NETWORK

(71) Applicant: Huawei Technologies Co., Ltd., Shenzhen (CN)

(72) Inventors: Sheng Liu, Shenzhen (CN); Zhou Lan, Shenzhen (CN); Teyan Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/382,168

(22) Filed: Dec. 16, 2016

(65) Prior Publication Data

US 2017/0104564 A1 Apr. 13, 2017

Related U.S. Application Data

(63) Continuation of application No. PCT/CN2014/080038, filed on Jun. 17, 2014.

(51) Int. Cl.
*H04W 4/00* (2009.01)
*H04L 5/00* (2006.01)
(Continued)

(52) U.S. Cl.
CPC .......... *H04L 5/0044* (2013.01); *H04L 1/0003* (2013.01); *H04L 27/20* (2013.01); *H04W 84/12* (2013.01)

(58) Field of Classification Search
None
See application file for complete search history.

(56) References Cited

U.S. PATENT DOCUMENTS

2010/0260159 A1 10/2010 Zhang et al.
2012/0201315 A1 8/2012 Zhang et al.
(Continued)

FOREIGN PATENT DOCUMENTS

| CN | 101984696 A | 3/2011 |
| CN | 103368879 A | 10/2013 |
| WO | WO 2013089525 A1 | 6/2013 |

OTHER PUBLICATIONS

"IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6 GHz," IEEE Computer Society, IEEE Std 802.11ac, Institute of Electrical and Electronic Engineers, New York, New York (2013).

(Continued)

*Primary Examiner* — Rebecca E Song
(74) *Attorney, Agent, or Firm* — Leydig, Voit & Mayer, Ltd.

(57) ABSTRACT

Embodiments of the present invention disclose a frame transmission method and an apparatus for a wireless local area network, which relate to the field of communications technologies. In the present invention, in a WLAN frame transmission process, a frame sent by a wireless local area network WLAN device is received, and identification of frames of different standards is completed by detecting a format indication field included in the frame, so as to implement backward compatibility of the WLAN device, so that hybrid networking of WLAN devices of different standards can be supported, flexibility of network deployment is improved, and networking complexity is reduced.

13 Claims, 7 Drawing Sheets

Receive a frame sent by a wireless local area network WLAN device, where the frame includes a format indication field, the format indication field includes N symbols, and N is a positive integer greater than or equal to 2 — 201

Determine a standard of the frame according to a preset check rule and modulation schemes used by the N symbols included in the format indication field — 202

(51) Int. Cl.
*H04L 27/20* (2006.01)
*H04L 1/00* (2006.01)
H04W 84/12 (2009.01)

(56) References Cited

U.S. PATENT DOCUMENTS

| | | | |
|---|---|---|---|
| 2012/0269124 A1* | 10/2012 | Porat | H04W 72/1231 |
| | | | 370/328 |
| 2012/0294294 A1 | 11/2012 | Zhang | |
| 2013/0148644 A1 | 6/2013 | Suh et al. | |
| 2014/0211703 A1* | 7/2014 | Seok | H04W 52/367 |
| | | | 370/329 |
| 2015/0117428 A1* | 4/2015 | Lee | H04L 27/206 |
| | | | 370/338 |
| 2015/0312907 A1* | 10/2015 | Lee | H04L 27/2085 |
| | | | 370/338 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Computer Society, IEEE Std 802.11n, Institute of Electrical and Electronic Engineers, New York, New York (2009).

\* cited by examiner 802.11a:
802.11n:
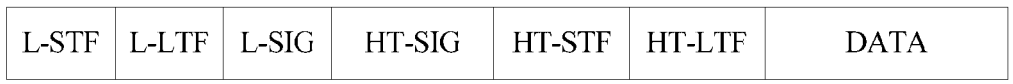
802.11ac:
FIG. 1
802.11ax:
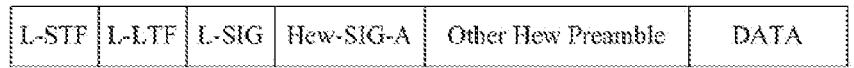
FIG. 2
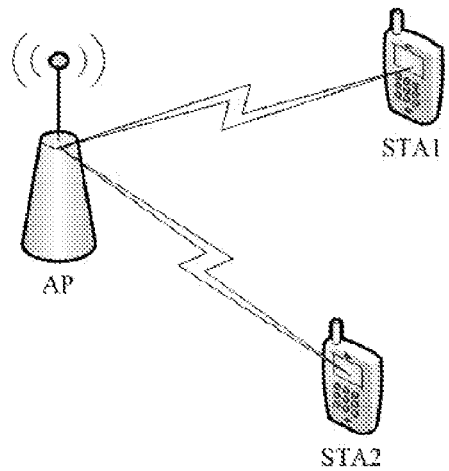
FIG. 3

```
┌─────────────────────────────────────────────────────────────┐
│ Receive a frame sent by a wireless local area network WLAN  │
│ device, where the frame includes a format indication field, │──— 201
│ the format indication field includes N symbols, and N is a  │
│ positive integer greater than or equal to 2                 │
└─────────────────────────────────────────────────────────────┘
                              │
                              ▼
┌─────────────────────────────────────────────────────────────┐
│ Determine a standard of the frame according to a preset     │
│ check rule and modulation schemes used by the N symbols     │──— 202
│ included in the format indication field                     │
└─────────────────────────────────────────────────────────────┘
```

FIG. 7

```
┌─────────────────────────────────────────────────────────────┐
│ Determine a frame as a frame of a first standard if the     │──— 2021
│ first symbol of N symbols is a symbol of a preset           │
│ modulation scheme                                           │
└─────────────────────────────────────────────────────────────┘
                              │
                              ▼
┌─────────────────────────────────────────────────────────────┐
│ Determine the frame as a frame of an $N^{th}$ standard if   │
│ none of first N symbols of N–1 symbols is a symbol of a     │──— 2022
│ preset modulation scheme, the $N^{th}$ symbol is a symbol   │
│ of the preset modulation scheme, and a format indication    │
│ field does not meet a preset check rule                     │
└─────────────────────────────────────────────────────────────┘
                              │
                              ▼
┌─────────────────────────────────────────────────────────────┐
│ Determine the frame as a frame of an $(N+1)^{th}$ standard  │
│ if none of first N–1 symbols of the N symbols is a symbol   │──— 2023
│ of a preset modulation scheme, the $N^{th}$ symbol is a     │
│ symbol of the preset modulation scheme, and the format      │
│ indication field meets the preset check rule                │
└─────────────────────────────────────────────────────────────┘
                              │
                              ▼
┌─────────────────────────────────────────────────────────────┐
│ Determine the frame as a frame of an $(N+1)^{th}$ standard  │
│ if none of first N–1 symbols of the N symbols is a symbol   │──— 2024
│ of a preset modulation scheme, the $N^{th}$ symbol is a     │
│ symbol of the preset modulation scheme, and the format      │
│ indication field meets the preset check rule                │
└─────────────────────────────────────────────────────────────┘
                              │
                              ▼
┌─────────────────────────────────────────────────────────────┐
│ Determine the frame as a frame of a $(K+1)^{th}$ standard   │
│ if none of first K symbols of the N symbols is a symbol of  │──— 2025
│ a preset modulation scheme and the $(K+1)^{th}$ symbol is a │
│ symbol of the preset modulation scheme, where K is a        │
│ positive integer less than N–1                              │
└─────────────────────────────────────────────────────────────┘
```

FIG. 8

FRAME TRANSMISSION METHOD AND APPARATUS FOR WIRELESS LOCAL AREA NETWORK

CROSS-REFERENCE TO RELATED APPLICATIONS

This application is a continuation of International Application No. PCT/CN2014/080038, filed on Jun. 17, 2014, the disclosure of which is hereby incorporated by reference in its entirety.

TECHNICAL FIELD

The present invention relates to the field of communications technologies, and in particular, to a frame transmission method and an apparatus for a wireless local area network.

BACKGROUND

The 802.11 protocol suite defined by the Institute of Electrical and Electronics Engineers (Institute of Electrical and Electronics Engineers, IEEE) is standards of a wireless local area network (Wireless local Access Network, WLAN). Existing WLAN standards based on an orthogonal frequency division multiplexing (Orthogonal Frequency Division Multiplexing, OFDM) technology include progressively evolving standards, such as 802.11a, 802.11n, and 802.11ac, and are still continuously evolving. As the WLAN develops and gradually gains popularity, a situation in which WLAN devices supporting different standards coexist will be long-standing. To implement backward compatibility, a wireless access point (AP) and a Station (STA) that use a new-generation standard both need to be capable of supporting use of a previous standard.

Because different frame formats are used in existing multiple WLAN standards and a future WLAN standard, a WLAN device that uses a new-generation standard needs to have a capability of identifying frames of different WLAN standards.

SUMMARY

Embodiments of the present invention provide a frame transmission method and an apparatus for a wireless local area network, which are used to identify different WLAN standards.

According to a first aspect, the present invention provides a frame transmission method for a wireless local area network, including:

receiving a frame sent by a wireless local area network WLAN device, where the frame includes a format indication field, the format indication field includes N symbols, and N is a positive integer greater than or equal to 3; and determining a standard of the frame according to modulation schemes used by the N symbols included in the format indication field.

In a first possible implementation manner of the first aspect, the determining a standard of the frame according to modulation schemes used by the N symbols included in the format indication field is specifically:

determining the frame as a frame of a first standard if the first symbol of the N symbols is a symbol of a preset modulation scheme.

In the first aspect or the first possible implementation manner of the first aspect, a second possible implementation manner of the first aspect is further provided, where the determining a standard of the frame according to modulation schemes used by the N symbols included in the format indication field is specifically:

determining the frame as a frame of a $(K+1)^{th}$ standard if none of first K symbols of the N symbols is a symbol of a preset modulation scheme and the $(K+1)^{th}$ symbol is a symbol of the preset modulation scheme, where K is a positive integer less than N.

In the first aspect or the first or second possible implementation manner of the first aspect, a third possible implementation manner of the first aspect is further provided, where the determining a standard of the frame according to modulation schemes used by the N symbols included in the format indication field is specifically:

determining the frame as a frame of an $(N+1)^{th}$ standard if none of the N symbols is a symbol of a preset modulation scheme.

In any one of the first to third possible implementation manners of the first aspect, a fourth possible implementation manner of the first aspect is further provided, where when N is equal to 3, the method includes: the first standard is 802.11n; when K is equal to 1, the $(K+1)^{th}$ standard is 802.11ac; when K is equal to 2, the $(K+1)^{th}$ standard is 802.11ax; and the $(N+1)^{th}$ standard is 802.11a.

In any one of the first to fourth possible implementation manners of the first aspect, a fifth possible implementation manner of the first aspect is further provided, where the preset modulation scheme is quadrature binary phase shift keying QBPSK.

In the fifth possible implementation manner of the first aspect, a sixth possible implementation manner of the first aspect is further provided, where after receiving the frame sent by the WLAN device, the method further includes:

determining energy of an in-phase component and energy of a quadrature component, where the in-phase component and the quadrature component are of the $M^{th}$ symbol of the N symbols, and M is a positive integer less than or equal to N; and determining the $M^{th}$ symbol as a QBPSK symbol if a difference obtained by subtracting the energy of the in-phase component from the energy of the quadrature component is greater than a preset threshold TH.

According to a second aspect, the present invention provides a frame transmission method for a wireless local area network, including:

receiving a frame sent by a wireless local area network WLAN device, where the frame includes a format indication field, the format indication field includes N symbols, and N is a positive integer greater than or equal to 2; and determining a standard of the frame according to a preset check rule and modulation schemes used by the N symbols included in the format indication field.

In a first possible implementation manner of the second aspect, the determining a standard of the frame according to a preset check rule and modulation schemes used by the N symbols included in the format indication field is specifically:

determining the frame as a frame of a first standard if the first symbol of the N symbols is a symbol of a preset modulation scheme.

In the second aspect or the first possible implementation manner of the second aspect, a second possible implementation manner of the second aspect is further provided, where the determining a standard of the frame according to a preset check rule and modulation schemes used by the N symbols included in the format indication field is specifically:

determining the frame as a frame of an $N^{th}$ standard if none of first N−1 symbols of the N symbols is a symbol of a preset modulation scheme, the $N^{th}$ symbol is a symbol of the preset modulation scheme, and the format indication field does not meet the preset check rule.

In the second aspect or the first or second possible implementation manner of the second aspect, a third possible implementation manner of the second aspect is further provided, where the determining a standard of the frame according to a preset check rule and modulation schemes used by the N symbols included in the format indication field is specifically:

determining the frame as a frame of an $(N+1)^{th}$ standard if none of first N−1 symbols of the N symbols is a symbol of a preset modulation scheme, the $N^{th}$ symbol is a symbol of the preset modulation scheme, and the format indication field meets the preset check rule.

In the second aspect or any one of the first to third possible implementation manners of the second aspect, a fourth possible implementation manner of the second aspect is further provided, where the determining a standard of the frame according to a preset check rule and modulation schemes used by the N symbols included in the format indication field is specifically:

determining the frame as a frame of an $(N+2)^{th}$ standard if none of the N symbols is a symbol of a preset modulation scheme.

In any one of the first to fourth possible implementation manners of the second aspect, a fifth possible implementation manner of the second aspect is further provided, where when N is equal to 2, the first standard is 802.11n; the $N^{th}$ standard is 802.11ac; the $(N+1)^{th}$ standard is 802.11ax; and the $(N+2)^{th}$ standard is 802.11a.

In the second aspect or any one of the first to fifth possible implementation manners of the second aspect, a sixth possible implementation manner of the second aspect is further provided, where when N is a positive integer greater than or equal to 3, the determining a standard of the frame according to a preset check rule and modulation schemes used by the N symbols included in the format indication field is specifically:

determining the frame as a frame of a $(K+1)^{th}$ standard if none of first K symbols of the N symbols is a symbol of the preset modulation scheme and the $(K+1)^{th}$ symbol is a symbol of the preset modulation scheme, where K is a positive integer less than N−1.

In any one of the first to sixth possible implementation manners of the second aspect, a seventh possible implementation manner of the second aspect is further provided, where the preset modulation scheme is quadrature binary phase shift keying QBPSK.

In the seventh possible implementation manner of the second aspect, an eighth possible implementation manner of the second aspect is further provided, where after receiving the frame sent by the WLAN device, the method further includes:

determining energy of an in-phase component and energy of a quadrature component, where the in-phase component and the quadrature component are of the $M^{th}$ symbol of the N symbols, and M is a positive integer less than or equal to N; and determining the $M^{th}$ symbol as a QBPSK symbol if a difference obtained by subtracting the energy of the in-phase component from the energy of the quadrature component is greater than a preset threshold TH.

According to a third aspect, the present invention provides a frame transmission method for a wireless local area network, including:

modulating, according to a preset rule, N symbols included in a format indication field of a frame, where N is a positive integer greater than or equal to 3, and the format indication field is used to indicate a standard of the frame; and sending the frame to a wireless local area network WLAN device.

In a first possible implementation manner of the third aspect, when N is equal to 3, the preset rule is specifically:

first two symbols of the format indication field do not use a preset modulation scheme, and the third symbol of the format indication field uses the preset modulation scheme.

In the first possible implementation manner of the third aspect, a second possible implementation manner of the third aspect is further provided, where the preset modulation scheme is quadrature binary phase shift keying QBPSK.

According to a fourth aspect, the present invention provides a frame transmission method for a wireless local area network, including:

modulating and coding, according to a preset rule, N symbols included in a format indication field of a frame, where N is a positive integer greater than or equal to 2, and the format indication field is used to indicate a standard of the frame; and sending the frame to a wireless local area network WLAN device.

In a first possible implementation manner of the fourth aspect, when N is equal to 2, the preset rule is specifically:

the first symbol of the format indication field does not use a preset modulation scheme, and the second symbol of the format indication field uses the preset modulation scheme; and a coding scheme of the format indication field meets a preset check rule.

In the first possible implementation manner of the fourth aspect, a second possible implementation manner of the fourth aspect is further provided, where the preset modulation scheme is quadrature binary phase shift keying QBPSK.

According to a fifth aspect, the present invention provides an apparatus for a wireless local area network, including:

a receiver, configured to receive a frame sent by a wireless local area network WLAN device, where the frame includes a format indication field, the format indication field includes N symbols, and N is a positive integer greater than or equal to 3; and a processor, configured to determine a standard of the frame according to modulation schemes used by the N symbols included in the format indication field received by the receiver.

In a first possible implementation manner of the fifth aspect, the processor is further configured to:

determine the frame as a frame of a first standard if the first symbol of the N symbols is a symbol of a preset modulation scheme.

In the fifth aspect or the first possible implementation manner of the fifth aspect, a second possible implementation manner of the fifth aspect is further provided, where the processor is further configured to:

determine the frame as a frame of a $(K+1)^{th}$ standard if none of first K symbols of the N symbols is a symbol of a preset modulation scheme and the $(K+1)^{th}$ symbol is a symbol of the preset modulation scheme, where K is a positive integer less than N.

In the fifth aspect or the first or second possible implementation manner of the fifth aspect, a third possible implementation manner of the fifth aspect is further provided, where the processor is further configured to:

determine the frame as a frame of an $(N+1)^{th}$ standard if none of the N symbols is a symbol of a preset modulation scheme.

In any one of the first to third possible implementation manners of the fifth aspect, a fourth possible implementation manner of the fifth aspect is further provided, where when N is equal to 3, the processor is further configured to:

determine the first standard as 802.11n; when K is equal to 1, determine the $(K+1)^{th}$ standard as 802.11ac; when K is equal to 2, determine the $(K+1)^{th}$ standard as 802.11ax; and determine the $(N+1)^{th}$ standard as 802.11a.

In any one of the first to fourth possible implementation manners of the fifth aspect, a fifth possible implementation manner of the fifth aspect is further provided, where the preset modulation scheme is quadrature binary phase shift keying QBPSK.

In the fifth possible implementation manner of the fifth aspect, a sixth possible implementation manner of the fifth aspect is further provided, where the processor is further configured to:

determine energy of an in-phase component and energy of a quadrature component, where the in-phase component and the quadrature component are of the $M^{th}$ symbol of the N symbols, and M is a positive integer less than or equal to N; and determine the $M^{th}$ symbol as a QBPSK symbol if a difference obtained by subtracting the energy of the in-phase component from the energy of the quadrature component is greater than a preset threshold TH.

According to a sixth aspect, the present invention provides an apparatus for a wireless local area network, including:

a receiver, configured to receive a frame sent by a wireless local area network WLAN device, where the frame includes a format indication field, the format indication field includes N symbols, and N is a positive integer greater than or equal to 2; and a processor, configured to determine a standard of the frame according to a preset check rule and modulation schemes used by the N symbols included in the format indication field received by the receiver.

In a first possible implementation manner of the sixth aspect, the processor is further configured to:

determine the frame as a frame of a first standard if the first symbol of the N symbols is a symbol of a preset modulation scheme.

In the sixth aspect or the first possible implementation manner of the sixth aspect, a second possible implementation manner of the sixth aspect is further provided, where the processor is further configured to:

determine the frame as a frame of an $N^{th}$ standard if none of first N−1 symbols of the N symbols is a symbol of a preset modulation scheme, the $N^{th}$ symbol is a symbol of the preset modulation scheme, and the format indication field does not meet the preset check rule.

In the sixth aspect or the first or second possible implementation manner of the sixth aspect, a third possible implementation manner of the sixth aspect is further provided, where the processor is further configured to:

determine the frame as a frame of an $(N+1)^{th}$ standard if none of first N−1 symbols of the N symbols is a symbol of a preset modulation scheme, the $N^{th}$ symbol is a symbol of the preset modulation scheme, and the format indication field meets the preset check rule.

In the sixth aspect or any one of the first to third possible implementation manners of the sixth aspect, a fourth possible implementation manner of the sixth aspect is further provided, where the processor is further configured to:

determine the frame as a frame of an $(N+2)^{th}$ standard if none of the N symbols is a symbol of a preset modulation scheme.

In any one of the first to fourth possible implementation manners of the sixth aspect, a fifth possible implementation manner of the sixth aspect is further provided, where when N is equal to 2, the processor is further configured to:

determine the first standard as 802.11n;
determine the $N^{th}$ standard as 802.11ac;
determine the $(N+1)^{th}$ standard as 802.11ax; and
determine the $(N+2)^{th}$ standard as 802.11a.

In the sixth aspect or any one of the first to fifth possible implementation manner of the sixth aspect, a sixth possible implementation manner of the sixth aspect is further provided, where when N is a positive integer greater than or equal to 3, the processor is further configured to:

determine the frame as a frame of a $(K+1)^{th}$ standard if none of first K symbols of the N symbols is a symbol of the preset modulation scheme and the $(K+1)^{th}$ symbol is a symbol of the preset modulation scheme, where K is a positive integer less than N−1.

In any one of the first to sixth possible implementation manners of the sixth aspect, a seventh possible implementation manner of the sixth aspect is further provided, where the preset modulation scheme is quadrature binary phase shift keying QBPSK.

In the seventh possible implementation manner of the sixth aspect, an eighth possible implementation manner of the sixth aspect is further provided, where the processor is further configured to:

determine energy of an in-phase component and energy of a quadrature component, where the in-phase component and the quadrature component are of the $M^{th}$ symbol of the N symbols, and M is a positive integer less than or equal to N; and determine the $M^{th}$ symbol as a QBPSK symbol if a difference obtained by subtracting the energy of the in-phase component from the energy of the quadrature component is greater than a preset threshold TH.

According to a seventh aspect, the present invention provides an apparatus for a wireless local area network, including:

a processor, configured to modulate, according to a preset rule, N symbols included in a format indication field of a frame, where N is a positive integer greater than or equal to 3, and the format indication field is used to indicate a standard of the frame; and a transmitter, configured to send, to a wireless local area network WLAN device, the frame determined by the processor.

In a first possible implementation manner of the seventh aspect, when N is equal to 3, the preset rule is specifically:

first two symbols of the format indication field do not use a preset modulation scheme, and the third symbol of the format indication field uses the preset modulation scheme.

In the first possible implementation manner of the seventh aspect, a second possible implementation manner of the seventh aspect is further provided, where the preset modulation scheme is quadrature binary phase shift keying QBPSK.

According to an eighth aspect, the present invention provides an apparatus for a wireless local area network, including:

a processor, configured to modulate and code, according to a preset rule, N symbols included in a format indication field of a frame, where N is a positive integer greater than or equal to 2, and the format indication field is used to indicate a standard of the frame; and a transmitter, configured to send, to a wireless local area network WLAN device, the frame determined by the processor.

In a first possible implementation manner of the eighth aspect, when N is equal to 2, the preset rule is specifically:

the first symbol of the format indication field does not use a preset modulation scheme, and the second symbol of the format indication field uses the preset modulation scheme; and a coding scheme of the format indication field meets a preset check rule.

In the first possible implementation manner of the eighth aspect, a second possible implementation manner of the eighth aspect is further provided, where the preset modulation scheme is quadrature binary phase shift keying QBPSK.

In the embodiments, in a WLAN frame transmission process, identification of frames of different standards is completed by detecting a format indication field of a received frame, so as to implement backward compatibility of a WLAN device, so that hybrid networking of WLAN devices of different standards can be supported, flexibility of network deployment is improved, and networking complexity is reduced.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

FIG. 1 is a schematic diagram of frame structures of 802.11a, 802.11n, and 802.11ac;

FIG. 2 is a schematic diagram of a frame structure of 802.11ax;

FIG. 3 is a schematic diagram of a WLAN deployment scenario;

FIG. 7 is a flowchart of a method according to Embodiment 2 of the present invention;

FIG. 8 is a flowchart of an implementation manner according to Embodiment 2 of the present invention;

DESCRIPTION OF EMBODIMENTS

Figure 4:
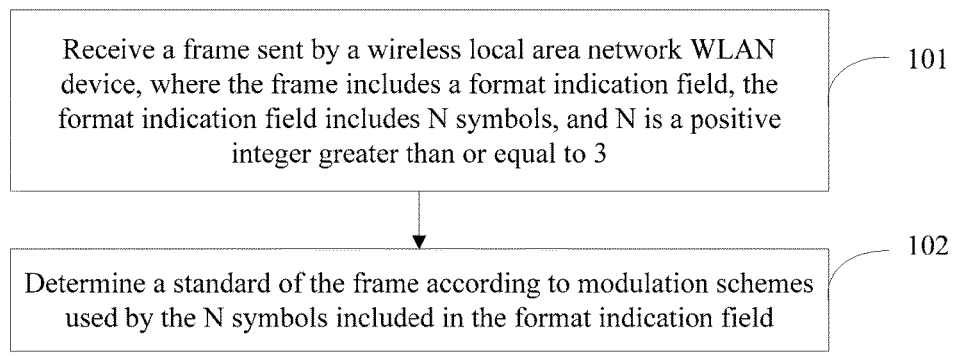
FIG. 4 is a flowchart of a method according to Embodiment 1 of the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In existing WLAN standards, there are relatively large differences between frame structures of the standards. FIG. 1 shows frame structures of 802.11a, 802.11n, and 802.11ac. FIG. 1 is merely used to exemplarily describe the frame structures, and does not represent actual field lengths or the like. The frame structures of the three standards all have a same legacy preamble (Legacy Preamble) field that specifically includes a legacy short training field (Legacy Short Training field, L-STF), a legacy long training field (Legacy Long Training field, L-LTF), and a legacy signal field (Legacy Signal field, L-SIG). Following the Legacy Preamble field, a data (Data) field is included in 802.11a; a high throughput signal field (High Throughput Signal field, HT-SIG), a high throughput short training field (High Throughput Short Training field, HT-STF), a high throughput long training field (High Throughput Long Training field, HT-LTF), and a data (Data) field are included in 802.11n; and a very high throughput signal-A field (Very High Throughput Signal-A field, VHT-SIG-A), a very high throughput short training field (Very High Throughput Short Training field, VHT-STF), a very high throughput long training field (Very High Throughput Long Training field, VHT-LTF), a very high throughput signal-B field (Very High Throughput Signal-B field, VHT-SIG-B), and a data (Data) field are included in 802.11ac.

In a subsequent evolution process of a WLAN, optionally, a future possible WLAN standard is provided, such as 802.11ax or another possible WLAN standard. Further, optionally, 802.11ax is used as an example, and FIG. 2 shows a possible frame structure of 802.11ax. For backward compatibility with a WLAN device using an existing standard, a start part of an 802.11ax frame is also a Legacy Preamble field, that is, includes L-STF, L-LTF, and L-SIG fields. Following the L-SIG field is a high efficiency wireless local area network signal-A field (High Efficiency WLAN Signal-A field, HEW-SIG-A), and then a remaining high efficiency wireless local area network preamble (Other Hew Preamble) field, where the Other Hew Preamble refers to one field or a combination of multiple fields, and is not limited to a specific field particularly, and following the Other Hew Preamble field is a data (Data) field. It should be particularly noted that, in a future possible WLAN standard, a name of the standard, a field name, or the like may be replaced with any other name and should not be construed as a limitation on the protection scope of the present invention.

FIG. 3 shows a typical WLAN deployment scenario, including one access point (Access Point, AP) and at least one station (Station, STA). Exemplarily, in the scenario shown in FIG. 3, the AP separately communicates with an STA1 and an STA2. Optionally, the AP may be a device that supports the 802.11ax standard and can be backward compatible with multiple WLAN standards such as 802.11ac, 802.11n, and 802.11a. The STA1 and the STA2 are WLAN devices that can support only a previous standard, where the STA1 supports the 802.11n and 802.11a standards, and the STA2 supports only the 802.11a standard. In this case, the 802.11n standard or the 802.11a standard may be used for communication between the AP and the STA1, and the 802.11a standard is used for communication between the AP and the STA2. In this case, when receiving a frame sent by an STA, the AP needs to identify a standard of the received frame to facilitate subsequent further processing.

Embodiment 1 of the present invention provides a frame transmission method for a wireless local area network, where the method is used to identify frames of different WLAN standards. Optionally, the different WLAN standards included in this embodiment may be specifically 802.11n, 802.11ac, 802.11ax, and 802.11a, which are recorded sequentially as a first standard to a fourth standard. FIG. 4 shows a procedure of the method in this embodiment, and specific steps are as follows:

101. Receive a frame sent by a wireless local area network WLAN device, where the frame includes a format indication field, the format indication field includes N symbols, and N is a positive integer greater than or equal to 3.

102. Determine a standard of the frame according to modulation schemes used by the N symbols included in the format indication field.

In step 101, the format indication field is N symbols of the frame that are used to identify different WLAN standards. The present invention does not limit a form of the format indication field. The format indication field may be N symbols that are specially used to identify a frame format, or may be N symbols reused by another field. Specifically, the format indication field may be reused by a signaling field or may be reused by a data field.

According to a preset rule, a specified modulation scheme or a combination of modulation schemes may be used for the N symbols included in the format indication field. Typically, different preset rules are used for frames of different standards.

In step 102, the standard of the frame may be determined according to the modulation schemes used by the symbols included in the format indication field, or a format of the frame is first determined and then the standard of the frame is further determined.

Figure 5:
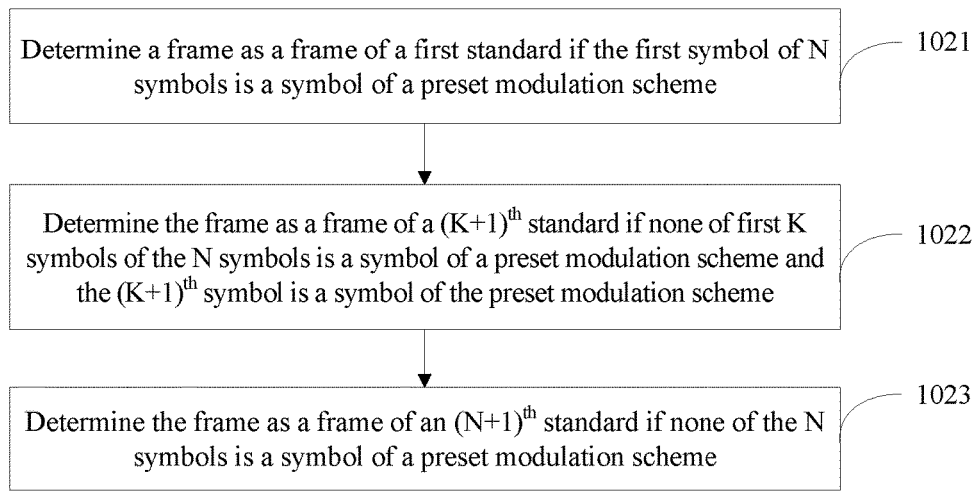
FIG. 5 is a flowchart of an implementation manner according to Embodiment 1 of the present invention.

Optionally, FIG. 5 shows an implementation manner of step 102, and a specific process is as follows:

1021. Determine the frame as a frame of a first standard if the first symbol of the N symbols is a symbol of a preset modulation scheme.

1022. Determine the frame as a frame of a $(K+1)^{th}$ standard if none of first K symbols of the N symbols is a symbol of a preset modulation scheme and the $(K+1)^{th}$ symbol is a symbol of the preset modulation scheme, where K is a positive integer less than N.

1023. Determine the frame as a frame of an $(N+1)^{th}$ standard if none of the N symbols is a symbol of a preset modulation scheme.

Optionally, in this embodiment, the format indication field includes three symbols located after a Legacy Preamble field, that is, N=3. Specifically, in 802.11n, two symbols included in an HT-SIG field and the first symbol included in an HT-STF field may be used as the format indication field; in 802.11a, first three symbols in a Data field may be used as the format indication field. A similar conclusion may also be obtained for a frame of another standard, and details are not described herein.

In step 1021, the preset modulation scheme is a preset specified modulation scheme. Optionally, the preset modulation scheme may be used for only a part or all of symbols in the format indication field, that is, the preset modulation scheme is not used for another symbol in the frame except the symbols included in the format indication field.

Optionally, in this embodiment, the preset modulation scheme is quadrature binary phase shift keying (Quadrature Binary Phase Shift Keying, QBPSK), and in a specific implementation process, the preset modulation scheme may also be set to another modulation scheme, and the present invention imposes no limitation thereto.

In 802.11n, an HT-SIG field includes two symbols, both of which use QBPSK modulation.

After receiving a frame, a receive end detects a symbol of a format indication field, and when detecting that the first symbol of the format indication field is a QBPSK symbol, the receive end may determine the received frame as a frame of a first standard, that is, a frame of the 802.11n standard.

Optionally, after detecting that the first symbol of the format indication field is a QBPSK symbol, the receive end may determine a standard of the frame. In this case, based on a purpose of identifying a WLAN standard rapidly and simply, detection may not be performed on a subsequent symbol in the format indication field. In addition, this embodiment also imposes no limitation on a modulation scheme used by the subsequent symbol, and the modulation scheme used by the subsequent symbol may be selected and determined based on a factor such as a system setting.

In 802.11ac, a VHT-SIG-A field includes two symbols, where the first symbol uses binary phase shift keying (Binary Phase Shift Keying, BPSK) modulation, and the second symbol uses QBPSK modulation. In 802.11ax, it may be determined, according to a system setting or the like, that an HEW-SIG-A field includes multiple symbols. In this embodiment, the determined format indication field includes N=3 symbols. If the HEW-SIG-A field includes less than three symbols, for example, two symbols, the format indication field may be the two symbols included in the HEW-SIG-A field and the first symbol of an Other Hew Preamble field; if the HEW-SIG-A field includes three symbols, the format indication field may be the three symbols included in the HEW-SIG-A field; if the HEW-SIG-A field includes more than three symbols, the format indication field may be first three symbols included in the HEW-SIG-A field.

In step 1022, after receiving a frame, a receive end detects symbols of a format indication field. If the receive end detects that the first symbol of the format indication field is not a QBPSK symbol and the second symbol is QBPSK, the receive end may determine the received frame as an 802.11ac frame; if the receive end detects that neither of first two symbols of the format indication field is a QBPSK symbol and the third symbol is QBPSK, the receive end may determine the received frame as an 802.11ax frame.

An 802.11ac device can be backward compatible. When identifying that a received frame is an 802.11a or 802.11n frame, the device may complete demodulation and decoding of the received frame, but when a frame received by the device is an 802.11ax frame, the device cannot implement demodulation or decoding of the 802.11ax frame, where in this case, it should be noted that the device may be capable of identifying the 802.11ax frame but cannot demodulate or decode the 802.11ax frame, or the device may be incapable of identifying the 802.11ax frame. When the device cannot identify the 802.11ax frame, the frame cannot pass CRC check of VHT-SIGA. After the check fails, the device performs an energy detection-based clear channel assessment (Clear Channel Assessment, CCA) after grouping duration indicated by grouping length information L_LENGTH carried in an L-SIG field, so as to avoid a potential channel contention conflict.

Optionally, in step 1022, when the receive end can complete identification without detecting all symbols included in the format indication field, if a modulation scheme used by another symbol, except a symbol that needs to be detected for frame identification, does not affect identification of a standard of the frame, the modulation scheme used by the symbol may be selected and determined based on a factor such as a system setting. For example, in an 802.11ac frame, the receive end can determine a standard of the frame after detecting first two symbols of a format indication field, and this embodiment imposes no limitation on whether to continue to detect a modulation scheme used by the third symbol. Optionally, if the receive end does not detect the third symbol, in a case in which the standard of the frame is accurately identified, a system processing delay can be reduced and a system resource can be reduced.

In 802.11a, typically, each symbol of a Data field may use a modulation scheme such as BPSK, quadrature phase shift keying (Quadrature Phase Shift Keying, QPSK), or quadrature amplitude modulation (Quadrature Amplitude Modulation, QAM). That is, in the Data field, none of the symbols uses QBPSK. That is, in this embodiment, none of three symbols in a format indication field of the 802.11a frame uses the preset modulation scheme. Therefore, in step 1023, after receiving a frame, a receive end detects symbols of a format indication field, and when detecting that none of three symbols of the format indication field is QBPSK, the receive end may determine the received frame as an 802.11a frame.

When receiving a frame of 802.11ac, 802.11ax, or the like, an 802.11a device demodulates and decodes the frame according to information indicated by an L-SIG field. However, because a non-data field part is further included following the L-SIG field in the received frame, the 802.11a device discards the received frame because the received frame cannot pass CRC.

In this embodiment, in a WLAN frame transmission process, identification of frames of different standards is completed by detecting a format indication field of a received frame, so as to implement backward compatibility of a WLAN device, so that hybrid networking of WLAN devices of different standards can be supported, flexibility of network deployment is improved, and networking complexity is reduced.

Optionally, the present invention further provides a method for detecting a modulation scheme of any symbol of a format indication field. Total energy of modulated symbols may be decomposed into energy of an in-phase component, that is, energy on an I (In-phase) branch, and energy of a quadrature component, that is, energy on a Q (Quadrature) branch. Specifically, for symbols modulated by using BPSK, the energy on the I branch is far greater than the energy on the Q branch; for symbols modulated by using QPSK, 16QAM, 64QAM, or the like, the energy on the I branch is close to the energy on the Q branch; for symbols modulated by using QBPSK, the energy on the Q branch is far greater than the energy on the I branch. Therefore, a difference between total energy on the Q branch and total energy on the I branch is used as a determining parameter, and is compared with a preset threshold, so that a modulation scheme of a received symbol can be distinguished rapidly and effectively. It should be considered that the foregoing method is merely an alternative method for detecting a modulation scheme of any symbol of a format indication field. In a specific implementation process, different detection methods may be selected, and the present invention imposes no limitation thereto.

Figure 6:
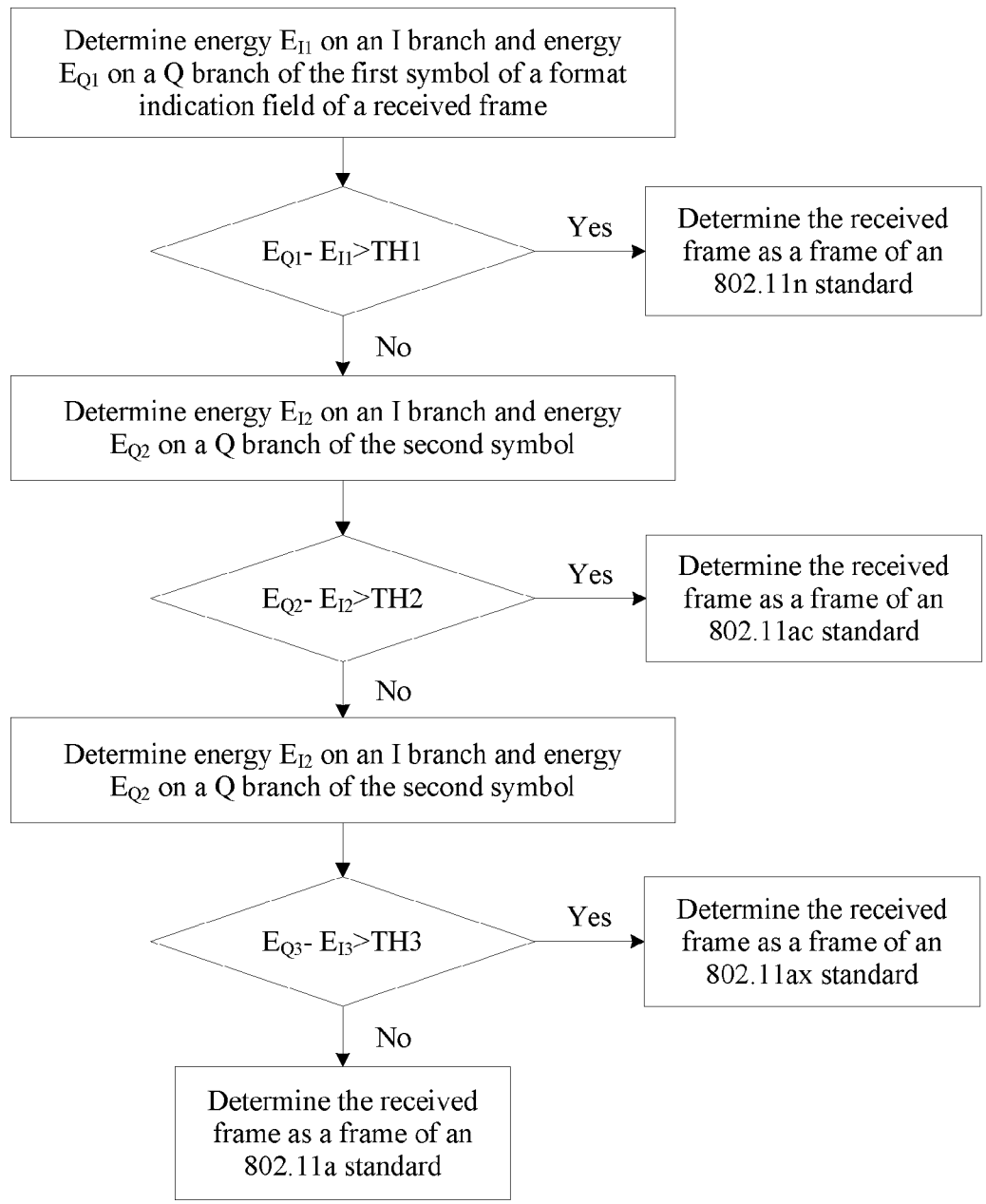
FIG. 6 is a flowchart of another implementation manner according to Embodiment 1 of the present invention.

Optionally, in an alternative implementation manner of steps 1021, 1022, and 1023, in step 102, the foregoing method may also be used to identify frames of different WLAN standards, and FIG. 6 shows a specific procedure of the method. Specific steps are as follows:

1024: Determine energy $E_{I1}$ on an I branch and energy $E_{Q1}$ on a Q branch of the first symbol of the format indication field of the received frame; if $E_{Q1}-E_{I1}>TH1$ is met, determine the first symbol as a QBPSK symbol; and further determine the received frame as a frame of an 802.11n standard, where TH1 is a threshold preset according to a system parameter and the like.

1025: If $E_{Q1}-E_{I1}>TH1$ is not met, determine that the first symbol is not a QBPSK symbol; further, determine energy $E_{I2}$ on an I branch and energy $E_{Q2}$ on a Q branch of the second symbol; if $E_{Q2}-E_{I2}>TH2$ is met, determine the second symbol as a QBPSK symbol; and further determine the received frame as a frame of an 802.11ac standard, where TH2 is a threshold preset according to a system parameter and the like, and optionally, TH2=TH1 is set.

1026: If $E_{Q2}-E_{I2}>TH2$ is not met, determine that the second symbol is not a QBPSK symbol; further, determine energy $E_{I3}$ on an I branch and energy $E_{Q3}$ on a Q branch of the third symbol; if $E_{Q3}-E_{I3}>TH3$ is met, determine the third symbol as a QBPSK symbol; and further determine the received frame as a frame of an 802.11ax standard, where TH3 is a threshold preset according to a system parameter and the like, and optionally, TH3=TH2=TH1 is set.

1027: If $E_{Q3}-E_{I3}>TH3$ is not met, determine that the third symbol is not a QBPSK symbol, where it can be learned that none of the three symbols of the format indication field is a QBPSK symbol, and determine the received frame as a frame of an 802.11a standard.

In this embodiment, a simple and efficient manner of identifying a standard of a frame is provided for a specified preset modulation scheme. Similarly, a flexible change and application may be made for another specific implementation scenario according to the technical solution and exemplary specific implementation manners provided in this embodiment. In this embodiment, based on implementation of accurate identification, an execution procedure may be further simplified, thereby improving efficiency, and reducing a delay.

Embodiment 2 of the present invention provides a frame transmission method for a wireless local area network, where the method is used to identify frames of different WLAN standards. Optionally, the different WLAN standards included in this embodiment may be specifically 802.11n, 802.11ac, 802.11ax, and 802.11a, which are recorded sequentially as a first standard to a fourth standard. FIG. 7 shows a procedure of the method in this embodiment, and specific steps are as follows:

201. Receive a frame sent by a wireless local area network WLAN device, where the frame includes a format indication field, the format indication field includes N symbols, and N is a positive integer greater than or equal to 2.

202. Determine a standard of the frame according to a preset check rule and modulation schemes used by the N symbols included in the format indication field.

In this embodiment, for the format indication field and a preset modulation scheme, refer to the description in Embodiment 1, and details are not described herein. The preset check rule may be one or a combination of more of check rules such as cyclic redundancy check (Cyclic Redundancy Check, CRC) and parity check.

In step 202, the standard of the frame may be determined according to the preset check rule and the modulation schemes used by the symbols included in the format indication field, or a format of the frame is first determined and then the standard of the frame is further determined.

Optionally, FIG. 8 shows an implementation manner of step 202 and a specific process is as follows:

2021. Determine the frame as a frame of a first standard if the first symbol of the N symbols is a symbol of a preset modulation scheme.

2022. Determine the frame as a frame of an $N^{th}$ standard if none of first N−1 symbols of the N symbols is a symbol of a preset modulation scheme, the $N^{th}$ symbol is a symbol of the preset modulation scheme, and the format indication field does not meet the preset check rule.

2023. Determine the frame as a frame of an $(N+1)^{th}$ standard if none of first N−1 symbols of the N symbols is a symbol of a preset modulation scheme, the $N^{th}$ symbol is a symbol of the preset modulation scheme, and the format indication field meets the preset check rule.

2024. Determine the frame as a frame of an $(N+2)^{th}$ standard if none of the N symbols is a symbol of a preset modulation scheme.

Optionally, in this embodiment, the format indication field includes two symbols located after a Legacy Preamble field, and the preset modulation scheme is QBPSK.

In step 2021, after receiving a frame, a receive end detects a symbol of a format indication field, and when detecting that the first symbol of the format indication field is a QBPSK symbol, the receive end may determine the received frame as a frame of a first standard, that is, a frame of the 802.11n standard. Optionally, similar to step 102, the receive end may not detect a subsequent symbol in the format indication field.

In step 2022, after receiving a frame, a receive end detects a symbol of a format indication field, and if the receive end detects that the first symbol of the format indication field is a BPSK symbol, the second symbol is QBPSK, and the format indication field does not meet the preset check rule, the receive end may determine the received frame as an 802.11ac frame. Optionally, that the format indication field does not meet the preset check rule is specifically that CRC is performed on the format indication field, but the format indication field cannot pass the check. In a specific implementation process, another preset check rule except CRC may also be used, and the present invention imposes no limitation thereto.

In step 2023, after receiving a frame, a receive end detects a symbol of a format indication field, and if the receive end detects that the first symbol of the format indication field is a BPSK symbol, the second symbol is QBPSK, and the format indication field meets the preset check rule, the receive end may determine the received frame as an 802.11ax frame.

In step 2024, after receiving a frame, a receive end detects symbols of a format indication field, and when detecting that none of three symbols of the format indication field is QBPSK, the receive end may determine the received frame as an 802.11a frame.

Optionally, if the format indication field is set to include three or more symbols, in addition to step 2021 to step 2024, step 202 may further include:

2025. Determine the frame as a frame of a $(K+1)^{th}$ standard if none of first K symbols of the N symbols is a symbol of a preset modulation scheme and the $(K+1)^{th}$ symbol is a symbol of the preset modulation scheme, where K is a positive integer less than N−1.

Optionally, for an execution process of step 2025, refer to step 1022, and details are not described herein.

In this embodiment, in a WLAN frame transmission process, identification of frames of different standards is completed by detecting a format indication field of a received frame, so as to implement backward compatibility of a WLAN device, so that hybrid networking of WLAN devices of different standards can be supported, flexibility of network deployment is improved, and networking complexity is reduced. Further, in this embodiment, a modulation scheme for the format indication field and a preset check rule are jointly used, so that a quantity of symbols included in the format indication field can be reduced, a system overhead is reduced, a transmission resource is reduced, frame transmission efficiency is improved, and a system throughput is improved.

Figure 9:
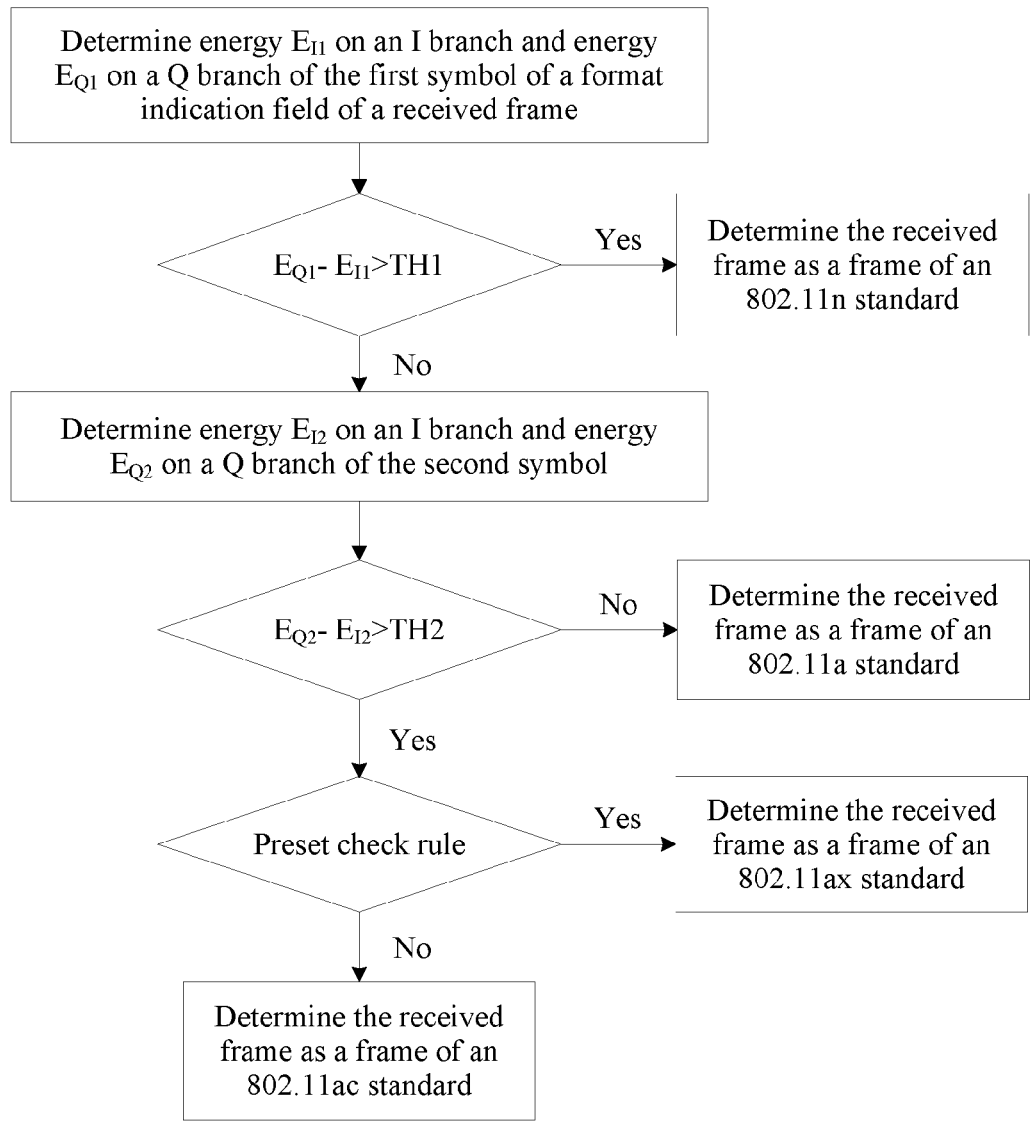
FIG. 9 is a flowchart of another implementation manner according to Embodiment 2 of the present invention.

Referring to steps 1024, 1025, 1026, and 1027 in Embodiment 1, in step 2021 to step 2024 in Embodiment 2, a similar method may be used to identify frames of different WLAN standards. FIG. 9 shows a specific procedure of the method, and details about a specific implementation process of the method are not described herein.

In the solutions provided in Embodiment 1 and Embodiment 2, only four standards, that is, 802.11n, 802.11ac, 802.11ax, and 802.11a, are used as examples for description, but the present invention may be applicable to multiple WLAN standards that are not limited to the listed standards, and in particular, 802.11ax merely refers to a future possible WLAN standard and may be replaced with another possible WLAN standard in a specific implementation process.

Figure 10:
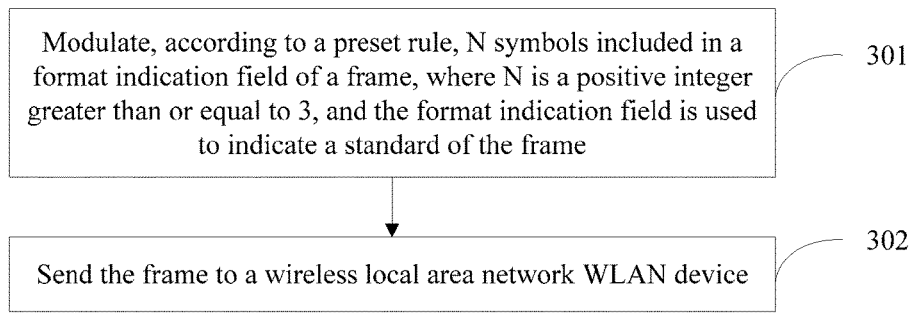
FIG. 10 is a flowchart of a method according to Embodiment 3 of the present invention.

Embodiment 3 of the present invention provides a frame transmission method for a wireless local area network. FIG. 10 shows a procedure of the method in this embodiment, and specific steps are as follows:

301. Modulate, according to a preset rule, N symbols included in a format indication field of a frame, where N is a positive integer greater than or equal to 3, and the format indication field is used to indicate a standard of the frame.

302. Send the frame to a wireless local area network WLAN device.

In step 301, the N symbols of the format indication field are modulated according to the preset rule by using a specified modulation scheme or a combination of modulation schemes, where the format indication field is the N symbols in the frame that are used to identify a WLAN standard.

Optionally, a preset rule may be that, when the format indication field includes three symbols, first two symbols of the format indication field do not use a preset modulation scheme, and the third symbol uses the preset modulation scheme, where for the first two symbols, a modulation scheme that is used by the two symbols and different from the preset modulation scheme may be selected and determined based on a factor such as a system setting. Typically, different preset rules are used for frames of different standards, so that a receive end can identify the frames of different standards. For an identification manner, refer to the description of Embodiment 1, and details are not described herein.

Further, optionally, the preset modulation scheme may be QBPSK or another modulation scheme, and the present invention imposes no limitation thereto.

In this embodiment, in a WLAN frame transmission process, a format indication field of a sent frame is processed, so that a receive end detects the format indication field of the received frame to complete identification of frames of different standards, so as to implement backward compatibility of a WLAN device, so that hybrid networking of WLAN devices of different standards can be supported, flexibility of network deployment is improved, and networking complexity is reduced.

Figure 11:
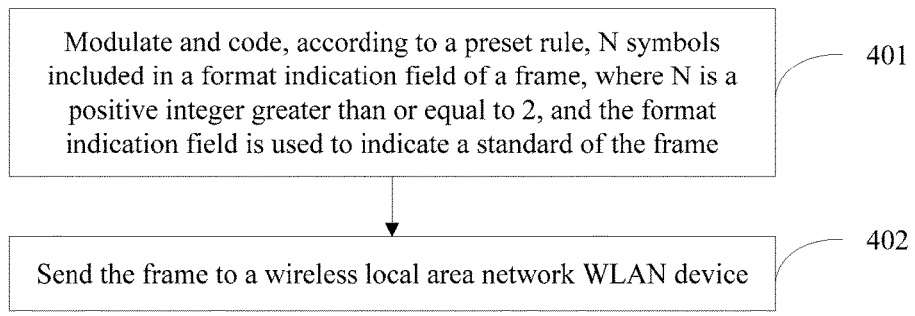
FIG. 11 is a flowchart of a method according to Embodiment 4 of the present invention.

Embodiment 4 of the present invention provides a frame transmission method for a wireless local area network. FIG. 11 shows a procedure of the method in this embodiment, and specific steps are as follows:

401. Modulate and code, according to a preset rule, N symbols included in a format indication field of a frame, where N is a positive integer greater than or equal to 2, and the format indication field is used to indicate a standard of the frame.

402. Send the frame to a wireless local area network WLAN device.

In step 401, the N symbols in the format indication field are modulated according to the preset rule by using a specified modulation scheme or a combination of modulation schemes, and the N symbols in the format indication field are coded according to the preset rule by using a specified coding scheme or a combination of coding schemes, where the format indication field is the N symbols in the frame that are used to identify a WLAN standard.

Optionally, a preset rule may include that, when the format indication field includes two symbols, the first symbol of the format indication field does not use a preset modulation scheme, and the second symbol uses the preset modulation scheme, where for the first symbol, a modulation scheme that is used by the first symbol and different from the preset modulation scheme may be selected and determined based on a factor such as a system setting. In addition, the preset rule may further include that the two symbols included in the format indication field use a specified channel coding scheme or interleaving mode, or the like. Optionally, 802.11ac and 802.11ax are used as examples, and the format indication field may use any one of the following coding schemes or a combination of multiple coding schemes.

Optionally, for different standards, format indication fields use different channel coding schemes. For example, an information bit of a format indication field of a frame of an 802.11ac standard is coded by using a convolutional code, and an information bit of a format indication field of an 802.11ax standard is coded by using a low-density parity-check (Low Density Parity Check, LDPC) code.

Optionally, for different standards, format indication fields use different interleavers after channel coding. For example, in a frame of an 802.11ac standard and a frame of an 802.11ax standard, information bits of format indication fields on which channel coding is performed are interleaved by using different interleavers separately.

Optionally, for different standards, format indication fields use CRC check codes of different lengths. For example, a format indication field of a frame of an 802.11ac standard uses an 8-bit CRC check code, and a format indication field of a frame of an 802.11ax standard uses a 12-bit CRC check code.

Optionally, for different standards, format indication fields use character sequences to scramble CRC check bits. For example, a character sequence "01010101" is used to scramble CRC check bits of an 802.11ax group, that is, perform a binary exclusive OR operation on the character sequence and the CRC check bits bit-by-bit. For an 802.11ac group, a character sequence of the 802.11ac group may be "11111111".

Optionally, for different standards, in format indication fields, a sequence of CRC check bits is specifically changed. For example, in 802.11ac, check bits generated after 8-bit CRC is performed on information of a format indication field are successively represented as $c_7$, $c_6$, $\Lambda$, $c_0$; in 802.11ax, CRC check bits generated after 8-bit CRC is performed on information of a format indication field enter the convolutional coder in a sorting sequence different from that in 802.11ac. For example, a sequence of CRC check bits may be changed in a cyclic shift manner, for example, cyclic shift is performed on the CRC check bits, the CRC check bits are directly reversed, or the like.

Typically, frames of different standards use different preset rules, so that a receive end can identify the frames of different standards.

Further, optionally, the preset modulation scheme may be QBPSK or another modulation scheme, and the present invention imposes no limitation thereto.

In this embodiment, in a WLAN frame transmission process, a format indication field of a sent frame is processed, so that a receive end detects the format indication field of the received frame to complete identification of frames of different standards, so as to implement backward compatibility of a WLAN device, so that hybrid networking of WLAN devices of different standards can be supported, flexibility of network deployment is improved, and networking complexity is reduced. Further, in this embodiment, a modulation scheme for the format indication field and a preset check rule are jointly used, so that a quantity of symbols included in the format indication field can be reduced, a system overhead is reduced, a transmission resource is reduced, frame transmission efficiency is improved, and a system throughput is improved.

Figure 12:
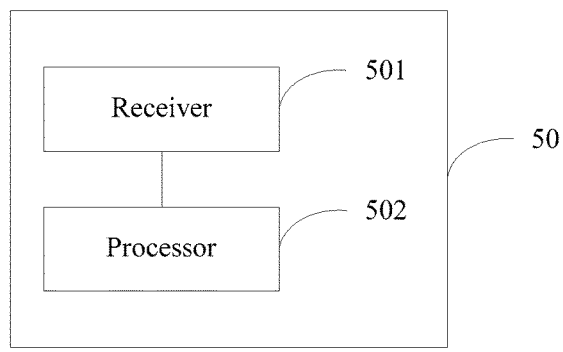
FIG. 12 is a schematic diagram of an apparatus according to Embodiment 5 of the present invention.

Embodiment 5 of the present invention provides an apparatus 50 for a wireless local area network, as shown in FIG. 12. The apparatus 50 provided in this embodiment includes a receiver 501 and a processor 502, and details are as follows:

the receiver 501 is configured to receive a frame sent by a wireless local area network WLAN device, where the frame includes a format indication field, the format indication field includes N symbols, and N is a positive integer greater than or equal to 3; and the processor 502 is configured to determine a standard of the frame according to modulation schemes used by the N symbols included in the format indication field received by the receiver 501.

Further, the processor 502 may be further configured to:

optionally, determine the frame as a frame of a first standard if the first symbol of the N symbols is a symbol of a preset modulation scheme;

optionally, determine the frame as a frame of a $(K+1)^{th}$ standard if none of first K symbols of the N symbols is a symbol of a preset modulation scheme and the $(K+1)^{th}$ symbol is a symbol of the preset modulation scheme, where K is a positive integer less than N; or optionally, determine the frame as a frame of an $(N+1)^{th}$ standard if none of the N symbols is a symbol of a preset modulation scheme.

In a specific implementation process, the processor 502 may use multiple solutions to determine the modulation schemes used by the symbols included in the format indication field. In an alternative solution, if a preset modulation scheme is QBPSK, the processor 502 may be further configured to:

determine energy $E_{I1}$ on an I branch and energy $E_{Q1}$ on a Q branch of the first symbol of the format indication field of the received frame; if $E_{Q1}-E_{I1}>TH1$ is met, determine the first symbol as a QBPSK symbol; and further determine the received frame as a frame of an 802.11n standard, where TH1 is a threshold preset according to a system parameter and the like;

if $E_{Q1}-E_{I1}>TH1$ is not met, determine that the first symbol is not a QBPSK symbol; further, determine energy $E_{I2}$ on an I branch and energy $E_{Q2}$ on a Q branch of the second symbol; if $E_{Q2}-E_{I2}>TH2$ is met, determine the second symbol as a QBPSK symbol; and further determine the received frame as a frame of an 802.11ac standard, where TH2 is a threshold preset according to a system parameter and the like, and optionally, TH2=TH1 is set;

if $E_{Q2}-E_{I2}>TH2$ is not met, determine that the second symbol is not a QBPSK symbol; further, determine energy $E_{I3}$ on an I branch and energy $E_{Q3}$ on a Q branch of the third symbol; if $E_{Q3}-E_{I3}>TH3$ is met, determine the third symbol as a QBPSK symbol; and further determine the received frame as a frame of an 802.11ax standard, where TH3 is a threshold preset according to a system parameter and the like, and optionally, TH3=TH2=TH1 is set; and if $E_{Q3}-E_{I3}>TH3$ is not met, determine that the third symbol is not a QBPSK symbol, where it can be learned that none of the three symbols of the format indication field is a QBPSK symbol, and determine the received frame as a frame of an 802.11a standard.

Optionally, in a process in which the processor 502 executes the foregoing solutions, the processor 502 may be divided into multiple functional entities to separately perform multiple steps, where the multiple functional entities may include but not be limited to:

a demodulation entity, configured to determine a modulation scheme used by a symbol included in the format indication field; and an energy detection entity, configured to determine energy on an I branch and energy on a Q branch of the symbol included in the format indication field.

It should be noted that regardless of whether the processor 502 performs the performed steps by using the multiple functional entities obtained by division and how to divide the processor 502 into the multiple functional entities, the above should fall within the protection scope of the present invention provided that the foregoing solutions are executed.

The apparatus 50 in Embodiment 5 may be configured to execute the technical solutions of Embodiment 1 shown in FIG. 4 to FIG. 6, and an implementation principle and a technical effect of the apparatus are similar to those in Embodiment 1. Details are not described herein.

Figure 13:
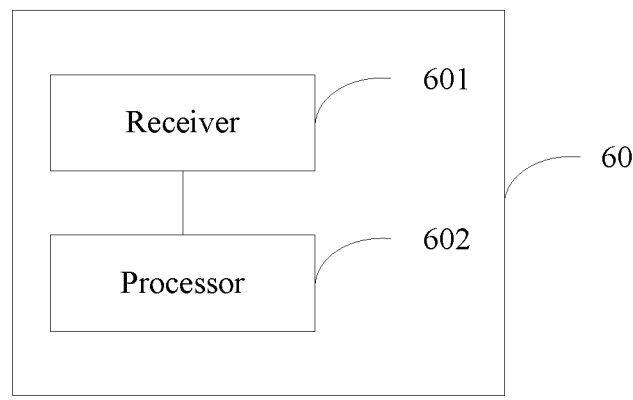
FIG. 13 is a schematic diagram of an apparatus according to Embodiment 6 of the present invention.

Embodiment 6 of the present invention provides an apparatus 60 for a wireless local area network, as shown in FIG. 13. The apparatus 60 provided in this embodiment includes a receiver 601 and a processor 602, and details are as follows:

the receiver 601 is configured to receive a frame sent by a wireless local area network WLAN device, where the frame includes a format indication field, the format indication field includes N symbols, and N is a positive integer greater than or equal to 2; and the processor 602 is configured to determine a standard of the frame according to a preset check rule and modulation schemes used by the N symbols included in the format indication field received by the receiver 601.

Further, the processor 601 may be further configured to:

optionally, determine the frame as a frame of a first standard if the first symbol of the N symbols is a symbol of a preset modulation scheme;

optionally, determine the frame as a frame of an $N^{th}$ standard if none of first N−1 symbols of the N symbols is a symbol of a preset modulation scheme, the $N^{th}$ symbol is a symbol of the preset modulation scheme, and the format indication field does not meet the preset check rule;

optionally, determine the frame as a frame of an $(N+1)^{th}$ standard if none of first N−1 symbols of the N symbols is a symbol of a preset modulation scheme, the $N^{th}$ symbol is a symbol of the preset modulation scheme, and the format indication field meets the preset check rule;

optionally, determine the frame as a frame of an $(N+2)^{th}$ standard if none of the N symbols is a symbol of a preset modulation scheme; or optionally, determine the frame as a frame of a $(K+1)^{th}$ standard if the format indication field is set to include three or more symbols, and if none of first K symbols of the N symbols is a symbol of a preset modulation scheme and the $(K+1)^{th}$ symbol is a symbol of the preset modulation scheme, where K is a positive integer less than N−1.

Referring to the processor 502 in Embodiment 5, the processor 602 in Embodiment 6 may be configured to perform step 2021 to step 2025 in Embodiment 2. In addition, the apparatus 60 in Embodiment 6 may be configured to execute the technical solutions of Embodiment 2 shown in FIG. 7 to FIG. 9, and an implementation principle and a technical effect of the apparatus are similar to those in Embodiment 2. Details are not described herein.

Figure 14:
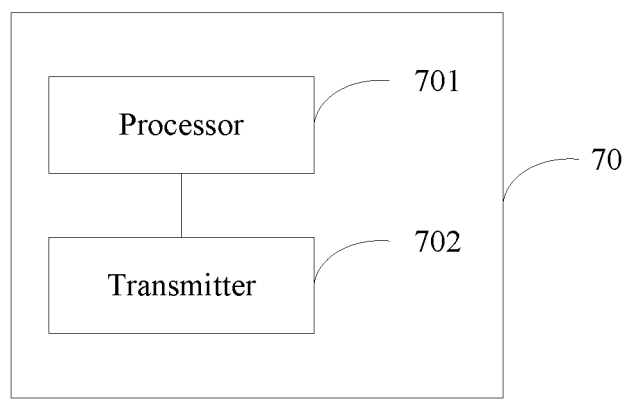
FIG. 14 is a schematic diagram of an apparatus according to Embodiment 7 of the present invention.

Embodiment 7 of the present invention provides an apparatus 70 for a wireless local area network, as shown in FIG. 14. The apparatus 70 provided in this embodiment includes a processor 701 and a transmitter 702, and details are as follows:

the processor 701 is configured to modulate, according to a preset rule, N symbols included in a format indication field of a frame, where N is a positive integer greater than or equal to 3, and the format indication field is used to indicate a standard of the frame; and the transmitter 702 is configured to send, to a wireless local area network WLAN device, the frame determined by the processor 701.

Optionally, the processor 701 may be further configured to:

when the format indication field includes three symbols, determine that first two symbols of the format indication field do not use a preset modulation scheme, and the third symbol uses the preset modulation scheme, where for the first two symbols, a modulation scheme that is used by the two symbols and different from the preset modulation scheme may be selected and determined based on a factor such as a system setting.

Further, optionally, the processor 701 may be further configured to:

when the format indication field includes three symbols, determine that first two symbols of the format indication field do not use a QBPSK modulation scheme, and the third symbol uses the QBPSK modulation scheme.

The apparatus 70 in Embodiment 7 may be configured to execute the technical solution of Embodiment 3 shown in FIG. 10, and an implementation principle and a technical effect of the apparatus are similar to those in Embodiment 3. Details are not described herein.

Figure 15:
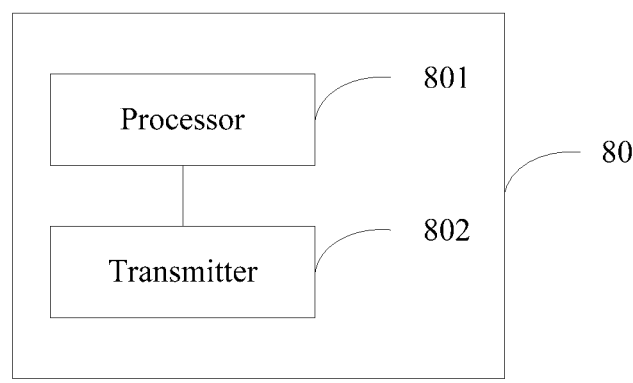
FIG. 15 is a schematic diagram of an apparatus according to Embodiment 8 of the present invention.

Embodiment 8 of the present invention provides an apparatus 80 for a wireless local area network, as shown in FIG. 15. The apparatus 80 provided in this embodiment includes a processor 801 and a transmitter 802, and details are as follows:

the processor 801 is configured to modulate and code, according to a preset rule, N symbols included in a format indication field of a frame, where N is a positive integer greater than or equal to 2, and the format indication field is used to indicate a standard of the frame; and the transmitter 802 is configured to send, to a wireless local area network WLAN device, the frame determined by the processor 801.

Optionally, the processor 801 may be further configured to:

determine that the first symbol of the format indication field does not use a preset modulation scheme, and the second symbol of the format indication field uses the preset modulation scheme; and determine a coding scheme for the format indication field that meets a preset check rule.

For the preset modulation scheme and the coding scheme that are determined by the processor 801, refer to the description in Embodiment 4. The apparatus 80 in Embodiment 8 may be configured to execute the technical solution of Embodiment 4 shown in FIG. 11, and an implementation principle and a technical effect of the apparatus are similar to those in Embodiment 4. Details are not described herein.

The apparatuses provided in Embodiment 5 to Embodiment 8 of the present invention may be applied in an AP or an STA, and may specifically include a fixed terminal, such as a WLAN router, a WLAN switch, a computer, or a server, or may include a mobile terminal, such as a mobile phone, a tablet computer, a wearable device, or a notebook computer. Further, the receiver or the transmitter may be a dedicated receiving apparatus or transmission apparatus, or may be a transceiver apparatus that integrates receiving and sending functions, or the like. The processor may be an integrated circuit (Integrated Circuit, IC), an application-specific integrated circuit (Application Specific Integrated Circuit, ASIC), a field programmable gate array (Field-Programmable Gate Array, FPGA), or the like, or may be integrated into a baseband processor or a general purpose processor.

Based on the foregoing descriptions of the embodiments, a person skilled in the art may clearly understand that the present invention may be implemented by software in addition to necessary general hardware. Based on such an understanding, all or a part of the steps of the technical solutions of the present invention may be implemented by a program instructing relevant hardware. The program may be stored in a computer readable storage medium. When the program is run, the steps of the foregoing embodiments are performed. The storage medium may be a ROM/RAM, a magnetic disk, an optical disc, and the like.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A frame transmission method for a wireless local area network, wherein the method comprises:

receiving a frame sent by a wireless local area network (WLAN) device, wherein the frame comprises a format indication field, the format indication field comprises N symbols, and N is a positive integer greater than or equal to 3; and determining a standard of the frame according to modulation schemes used by the N symbols comprised in the format indication field;

determining the frame is a frame of a first standard when the first symbol of the N symbols is a symbol of a preset modulation scheme, wherein the preset modulation scheme is quadrature binary phase shift keying (QBPSK);

determining energy of an in-phase component and energy of a quadrature component, wherein the in-phase component and the quadrature component are of a $M^{th}$ symbol of the N symbols, and M is a positive integer less than or equal to N; and determining the $M^{th}$ symbol is a QBPSK symbol when a difference obtained by subtracting the energy of the in-phase component from the energy of the quadrature component is greater than a preset threshold.

2. The method according to claim 1, wherein the determining a standard of the frame according to modulation schemes used by the N symbols comprised in the format indication field comprises:

determining the frame is a frame of a $(K+1)^{th}$ standard when none of first K symbols of the N symbols is a symbol of a preset modulation scheme and the $(K+1)^{th}$ symbol is a symbol of the preset modulation scheme, wherein K is a positive integer less than N.

3. The method according to claim 2, wherein when N is equal to 3, the method comprises: determining the first standard is 802.11n; when K is equal to 1, determining the $(K+1)^{th}$ standard is 802.11ac; when K is equal to 2, determining the $(K+1)^{th}$ standard is 802.11ax; and determining an $(N+1)^{th}$ standard is 802.11a.

4. The method according to claim 1, wherein the determining a standard of the frame according to modulation schemes used by the N symbols comprised in the format indication field comprises:

determining the frame is a frame of an $(N+1)^{th}$ standard when none of the N symbols is a symbol of a preset modulation scheme.

5. A frame transmission method for a wireless local area network, wherein the method comprises:

receiving a frame sent by a wireless local area network (WLAN) device, wherein the frame comprises a format indication field, the format indication field comprises N symbols, and N is a positive integer greater than or equal to 2;

determining a standard of the frame according to a preset check rule and modulation schemes used by the N symbols comprised in the format indication field;

determining the frame is a frame of a first standard when the first symbol of the N symbols is a symbol of a preset modulation scheme, wherein the preset modulation scheme is quadrature binary phase shift keying (QBPSK);

determining energy of an in-phase component and energy of a quadrature component, wherein the in-phase component and the quadrature component are of a $M^{th}$ symbol of the N symbols, and M is a positive integer less than or equal to N; and determining the $M^{th}$ symbol is a QBPSK symbol when a difference obtained by subtracting the energy of the in-phase component from the energy of the quadrature component is greater than a preset threshold.

6. A frame transmission method for a wireless local area network, wherein the method comprises:

modulating, according to a preset rule, N symbols comprised in a format indication field of a frame, wherein N is a positive integer greater than or equal to 3, and the format indication field is used to indicate a standard of the frame; and sending the frame to a wireless local area network (WLAN) device;

determining, by the device, the frame as a frame of a first standard if the first symbol of the N symbols is a symbol of a preset modulation scheme wherein the preset modulation scheme is quadrature binary phase shift keying QBPSK;

determining, by the device, energy of an in-phase component and energy of a quadrature component, wherein the in-phase component and the quadrature component are of a $M^{th}$ symbol of the N symbols, and M is a positive integer less than or equal to N; and determining, by the device, the $M^{th}$ symbol as a QBPSK symbol if a difference obtained by subtracting the energy of the in-phase component from the energy of the quadrature component is greater than a preset threshold TH.

7. The method according to claim 6, wherein when N is equal to 3, the preset rule comprises:

first two symbols of the format indication field do not use a preset modulation scheme, and the third symbol of the format indication field uses the preset modulation scheme.

8. An apparatus for a wireless local area network, wherein the apparatus comprises a processor and a non-transitory computer-readable storage medium including computer-executable instructions executed by the processor to perform operations comprising:

receiving by a receiver, a frame sent by a wireless local area network (WLAN) device, wherein the frame comprises a format indication field, the format indication field comprises N symbols, and N is a positive integer greater than or equal to 3; and determining a standard of the frame according to modulation schemes used by the N symbols comprised in the format indication field received by the receiver;

determining the frame as a frame of a first standard if the first symbol of the N symbols is a symbol of a preset modulation scheme, wherein the preset modulation scheme is quadrature binary phase shift keying QBPSK;

determining energy of an in-phase component and energy of a quadrature component, wherein the in-phase component and the quadrature component are of a $M^{th}$ symbol of the N symbols, and M is a positive integer less than or equal to N; and determining the $M^{th}$ symbol as a QBPSK symbol if a difference obtained by subtracting the energy of the in-phase component from the energy of the quadrature component is greater than a preset threshold TH.

9. The apparatus according to claim 8, wherein the operations further comprise:

determining the frame is a frame of a $(K+1)^{th}$ standard if none of first K symbols of the N symbols is a symbol of a preset modulation scheme and the $(K+1)^{th}$ symbol is a symbol of the preset modulation scheme, wherein K is a positive integer less than N.

10. The apparatus according to claim 9, wherein when N is equal to 3, the operations further comprise:

determining the first standard as 802.11n; when K is equal to 1, determining the $(K+1)^{th}$ standard is 802.11ac; when K is equal to 2, determining the $(K+1)^{th}$ standard is 802.11ax; and determining an $(N+1)^{th}$ standard is 802.11a.

11. The apparatus according to claim 8, wherein the operations further comprise:

determining the frame is a frame of an $(N+1)^{th}$ standard if none of the N symbols is a symbol of a preset modulation scheme.

12. An apparatus for a wireless local area network, wherein the apparatus comprises a processor and a non-transitory computer-readable storage medium including computer-executable instructions executed by the processor to perform operations comprising:

receiving a frame sent by a wireless local area network (WLAN) device, wherein the frame comprises a format indication field, the format indication field comprises N symbols, and N is a positive integer greater than or equal to 2; and determining a standard of the frame according to a preset check rule and modulation schemes used by the N symbols comprised in the format indication field received by the receiver;

wherein the frame is received by a receiver having a processor and a non-transitory computer-readable storage medium including computer-executable instructions executed by the processor to perform operations comprising:

determining the frame as a frame of a first standard if the first symbol of the N symbols is a symbol of a preset modulation scheme, wherein the preset modulation scheme is quadrature binary phase shift keying QBPSK;

determining energy of an in-phase component and energy of a quadrature component, wherein the in-phase component and the quadrature component are of a $M^{th}$ symbol of the N symbols, and M is a positive integer less than or equal to N; and determining the $M^{th}$ symbol as a QBPSK symbol if a difference obtained by subtracting the energy of the in-phase component from the energy of the quadrature component is greater than a preset threshold TH.

13. An apparatus for a wireless local area network, wherein the apparatus comprises a processor and a non-transitory computer-readable storage medium including computer-executable instructions executed by the processor to perform operations comprising:

modulating, according to a preset rule, N symbols comprised in a format indication field of a frame, wherein N is a positive integer greater than or equal to 3, and the format indication field is used to indicate a standard of the frame; and sending, to a wireless local area network (WLAN) device, the frame determined by the processor;

wherein the frame is received by a receiver having a processor and a non-transitory computer-readable storage medium including computer-executable instructions executed by the processor to perform operations comprising:

determining the frame as a frame of a first standard if the first symbol of the N symbols is a symbol of a preset modulation scheme, wherein the preset modulation scheme is quadrature binary phase shift keying QBPSK;

determining energy of an in-phase component and energy of a quadrature component, wherein the in-phase component and the quadrature component are of a $M^{th}$ symbol of the N symbols, and M is a positive integer less than or equal to N; and determining the $M^{th}$ symbol as a QBPSK symbol if a difference obtained by subtracting the energy of the in-phase component from the energy of the quadrature component is greater than a preset threshold TH.

* * * * *